United States Patent [19]
Beim et al.

[11] Patent Number: 5,692,988
[45] Date of Patent: Dec. 2, 1997

[54] MULTIPLE-SPEED AUTOMATIC TRANSMISSION FOR AN AUTOMOTIVE VEHICLE

[75] Inventors: Rudolf Beim, Bloomfield Hills; Daniel W. McCarrick, Canton, both of Mich.

[73] Assignee: Ford Global Technologies, Inc., Dearborn, Mich.

[21] Appl. No.: 653,181

[22] Filed: May 24, 1996

[51] Int. Cl.$^6$ .................................................. F16H 3/62
[52] U.S. Cl. ..................... 475/281; 475/280; 475/284; 475/285; 475/286; 475/287
[58] Field of Search ........................... 475/280, 281, 475/284, 285, 286, 287

[56] References Cited

U.S. PATENT DOCUMENTS

| | | | |
|---|---|---|---|
| 4,483,215 | 11/1984 | Ishimaru et al. | 475/280 X |
| 5,007,887 | 4/1991 | Asada | 475/280 X |
| 5,141,477 | 8/1992 | Oshidari | 475/280 X |

OTHER PUBLICATIONS

SAE 930676, "A New Approach to Finding Optimum Planetary Gear Trains for Automatic Transmissions", Oshidari et al, Mar. 1–5, 1993.

*Primary Examiner*—Charles A. Marmor
*Assistant Examiner*—Nathan O. Jensen
*Attorney, Agent, or Firm*—Frank G. McKenzie

[57] ABSTRACT

A kinematic arrangement of a multiple-speed automatic transmission for an automotive vehicle includes a simple planetary gear unit and a compound planetary gear unit, hydraulically actuated clutches and brakes applied and released selectively, and an overrunning clutch that produces a one-way drive connection between the carrier of the first gear unit and a nonrotating member such as the transmission casing. The simple planetary gear unit includes a sun gear, a ring gear surrounding the sun gear, a carrier, and a set of planet pinions in continuous meshing engagement with the sun gear and ring gear and rotatably supported on the carrier. The compound gear unit includes a sun gear, a ring gear surrounding the sun gear, a carrier, a first set of planet pinions in continuous driving engagement with the sun gear, and a second set of planet pinions in continuous engagement with the ring gear and the first set of planet pinions.

14 Claims, 1 Drawing Sheet

| | 76 | 78 | 80 | 82 | 84 | 86 | 72 |
|---|---|---|---|---|---|---|---|
| GEAR | CL1 | CL2 | CL3 | B1 | B2 | B3 | OWC1 |
| 1 | X | | | | | | X |
| 2 | X | | | X | | | |
| 3 | X | X | | | | | |
| 4 | | X | | X | | | |
| 5 | | X | | | X | | |
| REV. | | | X | | | X | |

5,692,988

1

MULTIPLE-SPEED AUTOMATIC TRANSMISSION FOR AN AUTOMOTIVE VEHICLE

BACKGROUND OF THE INVENTION

1. Field of the Invention

This invention relates to the field of automotive transmission kinematics. More particularly, it pertains to an arrangement of clutches, brakes, and planetary gear units for an automatic transmission.

2. Description of the Prior Art

Conventional transaxles include an hydrokinetic torque converter and a gearing system arranged either coaxially with the torque converter axis or parallel to that axis. In transaxles of this type, it is important that various torque transfer elements be arranged so that they occupy minimal space, particularly along the transverse of the motor vehicle. Gearbox length along that axis is minimized to permit the transaxle to be located in a front-wheel drive vehicle, one in which the engine and transmission are located in a compartment restricted in a transverse or lateral direction by chassis constraints, vehicle styling requirements, etc.

In addition, there is a growing need to develop more compact automatic transmission gear arrangements with an increasing number of speed ratios in order to realize better fuel economy and to improve driveability. The transmission described in SAE Technical Paper 930676 describes a relatively compact gear arrangement requiring three hydraulically actuated friction clutches and two hydraulically actuated friction brakes to produce five forward speed ratios and a reverse drive. Normally, five forward speed ratios and a reverse drive would require three simple planetary gear units. However, when five forward speed ratios can be produced using only two planetary gear units, there is a savings in the transverse dimension of the gearbox.

SUMMARY OF THE INVENTION

Objects of the kinematic arrangement of the present invention are to provide five forward speeds and reverse drive and to reduce the number of planetary gear units from three to two. An advantage of this invention is improvement in the packaging flexibility of the gearbox. This reduction in number of gear units is particularly important in transmissions where the output shafts must pass through the planetary gear units to the drive wheels.

In realizing these objects and advantages, the multiple-speed transmission of this invention includes an input shaft, an output shaft, and first compound planetary gear unit, and a second simple planetary gear unit. The first planetary gear unit includes a sun gear, ring gear, carrier, and first and second sets of pinions supported rotatably on the carrier, the first set of pinions driveably engaged with the sun gear and second set of pinions, the second set of pinions driveably engaged with the ring gear and first set of pinions. The second planetary gear unit includes a sun gear, ring gear, carrier, and a third set of pinions supported rotatably on the carrier and driveably engaged with the sun gear and ring gear of the second gear unit. The sun gear of the first gear unit is continually driveably connected to the input shaft, the ring gear of the second gear unit is continually driveably connected to the output shaft, the carrier of the first second gear unit and sun gear of the second gear unit are continually driveably connected mutually.

The gear units are controlled by several hydraulically-actuated friction elements, including a first clutch for alter-

2 natively driveably connecting and releasing the ring gear of the first gear unit and the carrier of the second gear unit, a second clutch for alternatively driveably connecting and releasing the input shaft and carrier of the second gear unit, a first brake for alternately holding against rotation and releasing the carrier of the first gear unit, a second brake for alternately holding against rotation and releasing the carrier of the first gear unit, a third clutch for alternatively driveably connecting and releasing the carrier of the first gear unit and input shaft, and a third brake for alternately holding against rotation and releasing the ring gear of the first gear unit.

To provide nonsynchronous gear changes between first and second gears, an overrunning coupling is included to produce a one-way drive connection between the carrier of the second gear unit and a nonrotating member such as the transmission casing.

DESCRIPTION OF THE PREFERRED EMBODIMENT

Figures 1, 2:
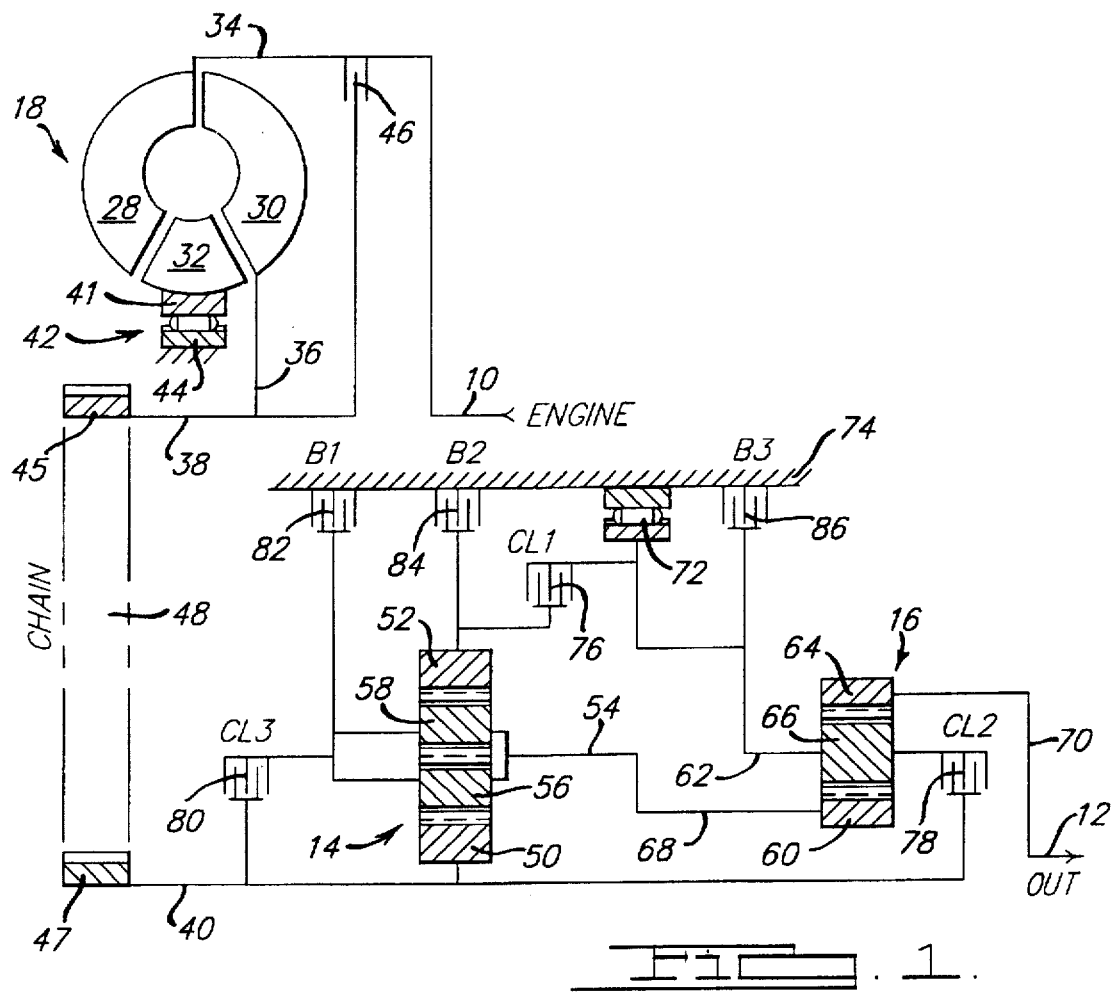
FIGS. 1 is schematic diagram of a kinematic arrangement of an automatic transmission according to the present invention.
FIG. 2 is a chart showing the state of the friction elements of FIG. 1 corresponding to each of the speed ratios of the transmission according to the present invention.

Referring to FIG. 1, an engine crankshaft 10 is driveably connected through various shafts, hydraulically actuated friction clutches and brakes, and multiple planetary gear units to an output shaft 12, which is adapted for connection to the traction wheels of a motor vehicle through a final drive gearset, differential, driveline, and axle assemblies. The main transmission housing encloses planetary gear units 14, 16.

An hydrokinetic torque converter 18 includes a bladed impeller 28, a bladed turbine 30, and a bladed stator 32. The impeller, turbine, and stator are arranged in fluid flow relationship in a common toroidal circuit. The impeller includes a casing 34 connected driveably to crankshaft 10. Turbine 30 includes turbine hub 36 splined to turbine shaft 38. The stator wheel is supported on the outer race 41 of a one-way clutch 42, whose inner race 44 is fixed to a nonrotating shaft or the transmission housing. Clutch 42 produces a drive connection between the nonrotating member and the stator wheel in a first directional sense and overruns allowing free rotation of the stator wheel relative to the nonrotating member in the opposite directional sense.

Torque converter lockup clutch 46 is splined to turbine shaft 38 and carries a friction surface, located at its radially outer end to engage driveably with the torque converter casing 34. Lockup clutch 46 is engaged to complete a mechanical connection between the impeller and turbine when pressurized hydraulic fluid contained in the torque converter casing forces the friction surfaces of clutch 46 against the casing 34. The torque converter is disengaged so that an hydrodynamic driving connection exists between the impeller and turbine when pressurized hydraulic fluid is supplied through a passage located between the converter casing and the friction surfaces of clutch 46 to disengage the clutch.

Power is transmitted by a belt or chain drive mechanism from the axis of the crankshaft 10 and turbine shaft 38 to a parallel axis colinear with an input shaft 40, about which planetary gear units 14, 16 and the clutches, brakes, and shafts of the kinematic arrangement are located. The drive mechanism includes a first sprocket wheel 45, rotatably mounted on turbine shaft 38, a second sprocket wheel 47, rotatably supported about the axis of input shaft 40, and a drive belt or chain 48 driveably engaged with sprocket wheels 45, 47. 40, a ring gear 52 surrounding the sun gear, a pinion carrier 54, a first set of planet pinions 56 driveably engaged with ring gear 50, and a second set of planet pinions 58 continually driveably engaged with ring gear 52 and the first set of planet pinions 56.

The second planetary gear unit 16 includes sun gear 60, carrier 62, a ring gear surrounding the sun gear and carrier, and a set of planet pinions 66 continually driveably engaged with ring gear 60 and sun gear 64.

Ring gear 60 is continually driveably connected through member 68 to carrier 54 of the first planetary gear unit, and ring gear 64 of the second planetary gear unit is connected through member 70 to output shaft 12.

Overrunning coupling 72 includes an inner race continually driveably connected to carrier 62 and an outer race fixed and held against rotation on the transmission casing 74. Located between the inner and outer races of the coupling are a set of rollers or sprags, which driveably engage the inner and outer races to produce a one-way drive connection between carrier 60 and the transmission casing when rotation is in one direction. One-way clutch 72 overruns when the directional sense of rotation is in a second direction, opposite the first direction.

A first hydraulically-actuated friction clutch 76 is engaged to produce a driveable connection among ring gear 52, carrier 62, and the inner race of one-way clutch 72, and is disengaged to permit those components to turn freely.

A second hydraulically-actuated friction clutch 78 is engaged to produce a driveable connection between input shaft 40 and carrier 62 of the second planetary gear unit 16, and is disengaged to permit free rotation of carrier 62 relative to shaft 40.

A third hydraulically actuated friction clutch 80 is engaged to produce a driveable connection between input shaft 40 and the carrier 54 of the second planetary gear unit 14, and is disengaged to permit shaft 40 to turn relative to the carrier 54.

A first hydraulically actuated friction brake 82 driveably connects and releases carrier 54 from the transmission housing 74 or another nonrotating member when the clutch is engaged and permits carrier 54 to turn freely when brake 82 is disengaged. A second hydraulically actuated friction brake 84 holds ring gear 52 against rotation when the brake is engaged and permits ring gear 52 to turn freely when the brake is disengaged. A third hydraulically actuated friction brake 86 holds carrier 62 against rotation, driveably connecting the carrier to housing 74 when the brake is engaged, and permits carrier 62 to turn freely when brake 86 is disengaged.

In operation, the first forward gear ratio is produced by engaging clutch 76, thereby driveably connecting ring gear 52 through clutch 76 and one-way clutch 72 to the transmission housing. Similarly, carrier 62 of the second planetary gear unit is held against rotation on the transmission housing through the driveable connection produced by one-way clutch 72. Sun gear 50 is driven directly by input shaft 40, and carrier 54 is underdriven in relation to the speed of input shaft 40 and its direction of rotation is reversed through gear unit 14. With carrier 62 held against rotation and sun gear 16 underdriven in the reverse direction, output is taken at ring gear 64, and output shaft 12 is driven in the forward direction at a still further speed reduction in relation to the speed of input shaft 40.

An upshift to the second speed ratio is produced by maintaining clutch 76 engaged and by engaging first brake 82, which holds carrier 54 of the first gear unit 14 and sun gear 60 of the second gear unit 16 fixed against rotation. The output of gear unit 14 is taken at ring gear 52, which is driveably connected through clutch 76 to carrier 62, which is underdriven in relation to the speed of input shaft 40. With sun gear 60 held fixed against rotation and carrier 62 driving, the output is taken at ring gear 64 and output shaft 12, thereby producing a somewhat lower speed reduction than at first forward ratio.

An upshift to the third forward speed ratio occurs by disengaging brake 82 and engaging clutch 78 while maintaining clutch 76 engaged. Ring gear 52 is driven at the speed of input shaft 40 through engagement of clutches 76 and 78, and sun gear 50 is continually driveably connected to the input shaft 40. Therefore, the output of gear unit 14 is taken at carrier 54, which drives sun gear 60 at the speed of the input shaft. Consequently, ring gear 64 and output shaft 12 are driven at the speed of the input shaft since sun gear 60 and carrier 62 of gear unit 16 are driven at that speed.

An upshift to the fourth speed ratio results by disengaging clutch 76, maintaining clutch 78 engaged, and by engaging first brake 82. This action overdrives ring gear 64 and output shaft 12 in relation to the speed of input shaft 40 because sun gear 60 is held fixed against rotation through operation of brake 82, and carrier 62 is driven at the speed of input shaft 40 through engagement of clutch 78.

An upshift to the fifth speed ratio results by maintaining clutch 78 engaged, disengaging brake 82, and engaging brake 84. Carrier 54 of the first gear unit is underdriven in a reverse direction due to ring gear 52 being held fixed against rotation by brake 84 and sun gear 50 being driveably connected to input shaft 40. Therefore, sun gear 60 is underdriven at the speed of carrier 54. Input shaft 40 drives carrier 62 of the second gear unit 16 due to engagement of clutch 78; therefore, ring gear 64 and output shaft 12 are overdriven in the forward direction by the second gear unit in relation to the speed and direction of shaft 40.

To produce reverse drive, reverse clutch 80 and reverse brake 86 are engaged concurrently, and the other friction elements are disengaged. Sun gear 60 of the second planetary gear unit 16 is driven at the speed of input shaft 40 through carrier 54 and clutch 80. Brake 86 holds carrier 62 fixed against rotation; therefore, ring gear 64 and output shaft 12 are underdriven in the reverse direction in relation to the speed and direction of input shaft 40.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple-speed transmission comprising:
    an input shaft;
    an output shaft;
    a first planetary gear unit supported on a first axis, having a sun gear, ring gear, carrier, and first and second sets of pinions supported rotatably on the carrier, the first set of pinions driveably engaged with the sun gear and second set of pinions, the second set of pinions driveably engaged with the ring gear and first set of pinions;

a second planetary gear unit supported on a first axis, having a sun gear, ring gear, carrier, and a third set of pinions supported rotatably on the second carrier and driveably engaged with the sun gear and ring gear of the second gear unit, the sun gear of the first gear unit continually driveably connected to the input shaft, the ring gear of the second gear unit continually driveably connected to the output shaft, the carrier of the first second gear unit and sun gear of the second gear unit continually driveably connected mutually;

a first clutch for alternatively driveably connecting and releasing the ring gear of the first gear unit and the carrier of the second gear unit;

a first brake for alternately holding against rotation and releasing the carrier of the first gear unit; and an overrunning coupling for producing a one-way drive connection between the carrier of the second gear unit and a nonrotating member.

2. The transmission of claim 1, wherein the overrunning coupling further comprises:

a first race continually driveably connected to the carrier of the second gear unit, and first clutch, a second race fixed to the nonrotating member; and a drive member located between the first and second races for producing a one-way drive connection between the first and second races.

3. The transmission of claim 1, further comprising a second clutch for alternatively driveably connecting and releasing the input shaft and carrier of the second gear unit.

4. The transmission of claim 3, further comprising a second brake for alternately holding against rotation and releasing the ring gear of the first gear unit.

5. The transmission of claim 1, further comprising:

a third clutch for alternatively driveably connecting and releasing the carrier of the first gear unit and input shaft; and a third brake for alternately holding against rotation and releasing the ring gear of the second gear unit.

6. A multiple-speed transmission comprising:

an input shaft;

an output shaft;

a first planetary gear unit supported on a first axis, having a sun gear, ring gear, carrier, and first and second sets of pinions supported rotatably on the carrier, the first set of pinions driveably engaged with the sun gear and second set of pinions, the second set of pinions driveably engaged with the ring gear and first set of pinions;

a second planetary gear unit supported on a first axis, having a sun gear, ring gear, carrier, and a third set of pinions supported rotatably on the second carrier and driveably engaged with the sun gear and ring gear of the second gear unit, the sun gear of the first gear unit continually driveably connected to the input shaft, the ring gear of the second gear unit continually driveably connected to the output shaft, the carrier of the first second gear unit and sun gear of the second gear unit continually driveably connected mutually;

a first clutch for alternatively driveably connecting and releasing the ring gear of the first gear unit and the carrier of the second gear unit;

a second clutch for alternatively driveably connecting and releasing the input shaft and carrier of the second gear unit;

a first brake for alternately holding against rotation and releasing the carrier of the first gear unit; and an overrunning coupling for producing a one-way drive connection between the carrier of the second gear unit and a nonrotating member.

7. The transmission of claim 6, wherein the overrunning coupling further comprises:

a first race continually driveably connected to the carrier of the second gear unit, and first clutch, a second race fixed to the nonrotating member; and a drive member located between the first and second races for producing a one-way drive connection between the first and second races.

8. The transmission of claim 6, further comprising:

a third clutch for alternatively driveably connecting and releasing the carrier of the first gear unit and input shaft; and a second brake for alternately holding against rotation and releasing the carrier of the second gear unit.

9. The transmission of claim 8, further comprising a third brake for alternately holding against rotation and releasing the ring gear of the first gear unit.

10. A multiple-speed transmission comprising:

an input shaft;

an output shaft;

a first planetary gear unit supported on a first axis, having a sun gear, ring gear, carrier, and first and second sets of pinions supported rotatably on the carrier, the first set of pinions driveably engaged with the sun gear and second set of pinions, the second set of pinions driveably engaged with the ring gear and first set of pinions;

a second planetary gear unit supported on a first axis, having a sun gear, ring gear, carrier, and a third set of pinions supported rotatably on the second carrier and driveably engaged with the sun gear and ring gear of the second gear unit, the sun gear of the first gear unit continually driveably connected to the input shaft, the ring gear of the second gear unit continually driveably connected to the output shaft, the carrier of the first second gear unit and sun gear of the second gear unit continually driveably connected mutually;

a first clutch for alternatively driveably connecting and releasing the ring gear of the first gear unit and the carrier of the second gear unit;

a second clutch for alternatively driveably connecting and releasing the input shaft and carrier of the second gear unit;

a first brake for alternately holding against rotation and releasing the carrier of the first gear unit;

a second brake for alternately holding against rotation and releasing the carrier of the first gear unit; and an overrunning coupling for producing a one-way drive connection between the carrier of the second gear unit and a nonrotating member.

11. The transmission of claim 10, wherein the overrunning coupling further comprises:

a first race continually driveably connected to the carrier of the second gear unit, and first clutch, a second race fixed to the nonrotating member; and a drive member located between the first and second races for producing a one-way drive connection between the first and second races.

12. The transmission of claim 11, further comprising:

a third clutch for alternatively driveably connecting and releasing the carrier of the first gear unit and input shaft; and a third brake for alternately holding against rotation and releasing the ring gear of the first gear unit.

13. A multiple-speed transmission comprising:

an input shaft;

an output shaft;

a first planetary gear unit supported on a first axis, having a sun gear, ring gear, carrier, and first and second sets of pinions supported rotatably on the carrier, the first set of pinions driveably engaged with the sun gear and second set of pinions, the second set of pinions driveably engaged with the ring gear and first set of pinions;

a second planetary gear unit supported on a first axis, having a sun gear, ring gear, carrier, and a third set of pinions supported rotatably on the second carrier and driveably engaged with the sun gear and ring gear of the second gear unit the sun gear of the first gear unit continually driveably connected to the input shaft, the ring gear of the second gear unit continually driveably connected to the output shaft, the carrier of the first second gear unit and sun gear of the second gear unit continually driveably connected mutually;

a first clutch for alternatively driveably connecting and releasing the ring gear of the first gear unit and the carrier of the second gear unit;

a second clutch for alternatively driveably connecting and releasing the input shaft and carrier of the second gear unit;

a first brake for alternately holding against rotation and releasing the carrier of the first gear unit; and a second brake for alternately holding against rotation and releasing the carrier of the first gear unit.

14. The transmission of claim 13, further comprising:

a third clutch for alternatively driveably connecting and releasing the carrier of the first gear unit and input shaft; and a third brake for alternately holding against rotation and releasing the ring gear of the first gear unit.

* * * * *